US011226828B2

(12) United States Patent
Vrabel et al.

(10) Patent No.: US 11,226,828 B2
(45) Date of Patent: Jan. 18, 2022

(54) WAKEUP INTERRUPT CONTROLLER

(71) Applicant: Arm Limited, Cambridge (GB)

(72) Inventors: Peter Vrabel, Cambridge (GB); Allan John Skillman, Kettering (GB)

(73) Assignee: Arm Limited, Cambridge (GB)

( * ) Notice: Subject to any disclaimer, the term of this patent is extended or adjusted under 35 U.S.C. 154(b) by 178 days.

(21) Appl. No.: 16/376,058

(22) Filed: Apr. 5, 2019

(65) Prior Publication Data

US 2020/0319895 A1   Oct. 8, 2020

(51) Int. Cl.

| G06F 9/4401 | (2018.01) |
| G06F 1/08 | (2006.01) |
| G06F 9/48 | (2006.01) |
| G06F 1/3296 | (2019.01) |

(52) U.S. Cl.
CPC .............. *G06F 9/4418* (2013.01); *G06F 1/08* (2013.01); *G06F 1/3296* (2013.01); *G06F 9/4812* (2013.01)

(58) Field of Classification Search
CPC ..... G06F 9/4418; G06F 9/4812; G06F 1/3296
See application file for complete search history.

(56) References Cited

U.S. PATENT DOCUMENTS

| 2009/0164817 | A1* | 6/2009 | Axford | ................. G06F 1/3203 713/322 |
| 2013/0073884 | A1* | 3/2013 | Ulmer | .................. G06F 1/3203 713/320 |
| 2017/0364137 | A1* | 12/2017 | Gendler | ................. G06F 13/24 |

* cited by examiner

Primary Examiner — Paul Yen
(74) Attorney, Agent, or Firm — Nixon & Vanderhye P.C.

(57) ABSTRACT

Apparatuses comprising data processing circuitry and a wakeup interrupt controller and methods of operating the apparatuses are disclosed. Prior to the processing circuitry entering a low power state, indications of pending interrupts are transferred to the wakeup interrupt controller. Further indications of interrupts received whilst the processing circuitry is in the low power state may be accumulated in the wakeup interrupt controller. When the wakeup interrupt controller receives a wakeup signal, the indications of pending interrupts are transferred to the processing circuitry and the processing circuitry exits the low power state.

18 Claims, 7 Drawing Sheets

WAKEUP INTERRUPT CONTROLLER

TECHNICAL FIELD

The present disclosure relates to data processing apparatuses. In particular, the present disclosure relates to the management of interrupts and the receipt of interrupts when processing circuitry is in a reduced power state.

DESCRIPTION

Interrupts may be used to alert processing circuitry to an event that needs attention. When the processing circuitry enters a sleep mode, or at least a state in which the power supplied is reduced in some way, some state in the processing circuitry may be lost including indications of pending interrupts which have been received but not yet acted upon.

SUMMARY

At least some examples provide an apparatus comprising: processing circuitry for performing data processing operations, wherein the processing circuitry comprises active-time storage for storing indications of pending events to which the processing circuitry has yet to respond; and a wakeup interrupt controller, wherein the wakeup interrupt controller comprises sleep-time storage for storing indications of events received whilst the processing circuitry is in a low power state,
wherein the processing circuitry is responsive to a low power trigger to transfer content of the active-time storage into the sleep-time storage in the wakeup interrupt controller prior to the processing circuitry entering the low power state, and
the wakeup interrupt controller is responsive to receipt of a predetermined wakeup signal to cause the processing circuitry to exit the low power state and to transfer content of the sleep-time storage to the active-time storage in the processing circuitry before the processing circuitry resumes the data processing operations.

At least some examples provide a method operating an apparatus comprising:
performing data processing operations in processing circuitry, wherein the processing circuitry comprises active-time storage for storing indications of pending events to which the processing circuitry has yet to respond;
storing indications of events received whilst the processing circuitry is in a low power state in sleep-time storage;
transferring content of the active-time storage into the sleep-time storage in response to a low power trigger prior to the processing circuitry entering the low power state; and
in response to receipt of a predetermined wakeup signal, causing the processing circuitry to exit the low power state and transferring content of the sleep-time storage to the active-time storage in the processing circuitry before the processing circuitry resumes the data processing operations.

At least some examples provide an apparatus comprising:
means for performing data processing operations, wherein the means for performing data processing operations comprises means for storing indications of active-time events to which the processing circuitry has yet to respond;
means for storing indications of sleep-time events received whilst the processing circuitry is in a low power state;
means for transferring content of the means for storing indications of active-time events into the means for storing indications of sleep-time events in response to a low power trigger prior to the means for performing data processing operations entering the low power state; and
in response to receipt of a predetermined wakeup signal, means for causing the means for performing data processing operations to exit the low power state and transferring content of the means for storing sleep-time events to the means for storing active-time events before the means for performing data processing operations resumes the data processing operations.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In order to save power, some data processing systems have the ability to implement a low power state. In this state, the power supply to one or more elements of the systems is reduced or removed. This may result in at least some state held in the core being lost. If there is information about pending interrupts or other event indications held in the system, this could be lost when the system enters low power mode, despite the ongoing need for these interrupts/events to be serviced. Software may be implemented to save the pending interrupts to memory before the systems enters the low power state. However this creates a race condition in which new interrupts may still be received after the software is initiated (and the interrupts saved) but before the system enters the low power state. Thus information describing some interrupts/events may still be lost.

The present techniques provide an approach according to which interrupts/events are automatically saved (by hardware) in a wakeup interrupt controller (WIC) just before the system enters the low power mode. These pending interrupts/events received whilst the processing circuitry is in sleep mode are then transferred back to the processing circuitry when the WIC detects a wakeup signal and causes the processing circuitry to exit the sleep mode and continue active operation.

In accordance with one example configuration there is provided an apparatus comprising processing circuitry for performing data processing operations, wherein the processing circuitry comprises active-time storage for storing indications of pending events to which the processing circuitry has yet to respond. A wakeup interrupt controller is provided, wherein the wakeup interrupt controller comprises sleep-time storage for storing indications of events received whilst the processing circuitry is in a low power state. The processing circuitry is responsive to a low power trigger to transfer content of the active-time storage into the sleep-time storage in the wakeup interrupt controller prior to the processing circuitry entering the low power state. The wakeup interrupt controller is responsive to receipt of a predetermined wakeup signal to cause the processing circuitry to exit the low power state and to transfer content of the sleep-time storage to the active-time storage in the processing circuitry before the processing circuitry resumes the data processing operations.

Events such as interrupts signal to the processing circuitry that execution of the current instruction stream should be suspended and a function such as an interrupt handler or interrupt service routine (ISR) should be executed. Different types of interrupt or event may trigger different corresponding handling functions and may even have different priority levels, i.e. some are more critical than others and are handled before indications with a lower priority level. The handling of interrupts and events, deciding priority levels and taking them into account may be implemented by an interrupt controller. Indications of interrupts or events which have yet to be handled may be generally referred to herein as "pending interrupts". According to the present techniques, indications of these pending interrupts are stored in active-time storage within the processing circuitry. That is, storage for indications of events and for interrupts that have been received whilst the processing circuitry has been active (i.e. not in a low power state).

When the processing circuitry is in a low power state such pending interrupts are stored in a wakeup interrupt controller. Sleep-time storage is provided to store indications of events received whilst the processing circuitry has some or all of its power withheld (i.e. is in a low power state). Interrupts may be generated by a range of different devices external to the processing circuitry. As such, these signals may continue to be generated even whilst the processing circuitry is in a low power state. It is these during-sleep-mode indications that are received and stored by the WIC. The low power state may also be referred to as a sleep mode, a reduced power mode or any other label indicating that the processing circuitry receives less power in this state than in a fully functional processing state.

According to the present techniques, the processing circuitry is responsive to a low power trigger to transfer content of the active-time storage into the sleep-time storage prior to the processing circuitry entering the low power state. Before the processing circuitry enters the low power state, the pending interrupts are transferred to the WIC. Note in particular that this is a hardware-controlled process, so uncertainties associated with the above-mentioned race condition, to which a software-controlled process is vulnerable, are mitigated. The indications transferred to the WIC from the processing circuitry are held in the same storage as indications of any further interrupts which are then received during the low power state. As this is done automatically (through a hardware process) just before the processing circuitry enters the low power mode, the indications are not lost when power is removed (or reduced) from the processing circuitry.

The wakeup interrupt controller is responsive to receipt of a predetermined wakeup signal to cause the processing circuitry to exit the low power state and to transfer content of the sleep-time storage to the active-time storage in the processing circuitry before the processing circuitry resumes the data processing operations. Certain types of events may necessitate immediate handling by the processing circuitry. If one of these "wakeup signals" is received by the WIC whilst the processing circuitry is in the low power state it is caused to exit the low power state, such that it can handle the interrupt or respond to the event. As part of this exit from sleep, the components of the processing circuitry are resupplied with power, and the contents of the sleep-time storage are transferred back to the active-time storage. That is, on exit from the low power state, the active time storage contains the interrupts that were pending before the processing circuitry entered the low power state and the interrupts that occurred whilst the processing circuitry was in the low power state. The processing circuitry (which may comprise a dedicated interrupt controller) then handles the wakeup signal and any other pending interrupts, which may be dealt with in a different order to that in which they were received according to a priority scheme.

In at least some examples, the sleep-time storage is further arranged to store information defining the predetermined wakeup signal. Before the processing circuitry enters the low power state, it thus can define which interrupts or events should be classified as wakeup signals. That is, before entering the sleep mode, the processing circuitry decides which events should wake it up again. This information defining the wakeup signals may be transferred to the WIC before the processing circuitry enters the low power state and stored along with the pending interrupts in the sleep-time storage.

The indications of events stored in the WIC (in its sleep-time storage) or the processing circuitry (in its active-time storage) may be interrupts as mentioned above. These may be signals generated by a user input into a hardware device such as a keyboard. They may also be signals generated by other peripheral devices outside of the processing circuitry such as a disk controller.

It will be understood that for the purposes of this description the term interrupt is generally used to mean an indication or signal that an event has occurred. However, the indication may also pertain to a request for the processing circuitry to carry out a mode switching operation. For example, a request for the processing circuitry to enter a debug mode may also be stored in the WIC or the active-time storage. Similarly, the indication may be an event signal from further processing circuitry. If an apparatus according to the present technology is part of a larger system, for example comprising multiple processor cores, the different processors may need to communicate that an event has taken place. As such indications of these events may be pertinent to the interrupt management of the current apparatus.

As mentioned above, the processing circuitry may be responsive to the low power trigger to transfer information defining the predetermined wakeup signal to the wakeup interrupt controller. Hence at the same time that the indications of pending interrupts are transferred to the WIC, the processing circuitry may also transfer information defining the events for which it will exit the low power state. This means that the WIC is able to define which events should trigger exit from the low power state. This information may be set depending on which kind of low power state the processing circuitry is entering or it may be fixed.

The predetermined wakeup signal may be one of a plurality of predetermined wakeup signals. There may be more than one event that should trigger the processing circuitry to exit the low power state. If one of the events occurs whilst the processing circuitry is in the low power state, then the WIC will control the processing circuitry to exit the low power state (for example in cooperation with a power management device which controls the power state of the processing circuitry) and it can then handle the interrupt that has been asserted. It should be noted that the wakeup signal could comprise more than one signal received by the WIC. That is, wakeup could occur on the condition that (at least) two specific events have occurred for example.

The processing circuitry may therefore be responsive to the low power trigger to transfer information defining the plurality of predetermined wakeup signals to the wakeup interrupt controller. Information defining all of the possible wakeup signals may be transferred to the WIC before the processing circuitry enters the low power state.

The low power state may be a state in which power is withheld from one or more components of the processing circuitry. In order to save power, the low power state may be one in which the power supply to one or more components is turned off. More than one sleep mode may be supported, with a "shallow sleep" mode being one in which fewer components have power withheld or reduced, and with a "deep sleep" mode being one in which more components have their power withheld. The WIC remains powered whilst the processing circuitry is in a low power state.

The low power state may be a state in which power is supplied at a reduced voltage to one or more components of the processing circuitry. In some cases, components are supplied with a reduced voltage such that the values they hold are preserved. The processing circuitry does not continue to execute instructions when it is in the low power state. In this way, less power is consumed by the processing circuitry compared to the fully powered state, but at least some of the state held is retained. By reducing the voltage supplied to components, rather than removing the power supply altogether, exit from the low power state may be quicker as the full state does need to be repopulated. This approach may be used to implement an example of the above-mentioned "shallow" sleep mode.

The low power state may be a state in which a clock signal generated by a clock generator is withheld from the processing circuitry. It may be the case that the clock generator is switched off in the low power state. It may otherwise be that a clock domain covering the processing circuitry has its defining clock signal withheld. The processing circuitry therefore does not execute any instructions. Exit from this low power state may also be relatively fast as the storage holding the relevant values may not need to be repopulated as the power supply has not been disrupted. It will be appreciated that a combination of these techniques may be used to implement a low power state.

In at least some examples, the low power trigger is a signal generated by the processing circuitry. For example, the processing circuitry itself can be configured to define which power state it should be in and to enter a low power state when it is appropriate to do so. It could make a determination based on current workload, for example, or it could make a determination based on the occurrence of an idle period. There may be a dedicated low power control element of the processing circuitry to control entry to and exit from a low power state.

The low power trigger may be a signal received by the processing circuitry. An external device such as a power management controller may be provided and be arranged to determine when the processing circuitry should enter a low power state. This may be determined on the basis of the workload of other processor circuitry for example. In this case, the low power trigger is a signal originating from outside of the processing circuitry, but received by it, and further causing it to enter a low power state.

In some embodiments, the processing circuitry comprises an interrupt controller, and the interrupt controller comprises the active-time storage. When the processing circuitry is not in the low power state, the active-time storage stores interrupts received but still to be handled by the processing circuitry. An interrupt controller including this storage may be used to manage pending interrupts and ensure they are handled whilst taking into account any applicable priority scheme. The interrupt controller may for example ensure that the interrupts are not handled such that other required tasks are disrupted.

The wakeup interrupt controller and the processing circuitry may be arranged to perform a handshake process to ensure that all of the indications of pending events are transferred from the active-time storage to the sleep-time storage prior to the processing circuitry entering the low power state. Checks are performed between the processing circuitry and the WIC to ensure that any and all interrupts that occur before the processing circuitry has fully entered the low power states are transferred successfully to the sleep-time storage in the WIC.

Some embodiments comprise a system wherein the processing circuitry has a plurality of cores, each core of the plurality of cores arranged to perform respective data processing operations. Each of the plurality of cores comprises respective active-time storage, and the wakeup interrupt controller comprises respective sleep-time storage for each of the plurality of cores. Each respective sleep-time storage is arranged to store indications of events received for the respective core whilst the processing circuitry is in the low power state and, when the processing circuitry receives the low power trigger, it transfers the respective content of each respective active-time storage to the respective sleep-time storage. The wakeup interrupt controller is responsive to receipt of the predetermined wakeup signal to cause the processing circuitry to exit the low power state and to transfer respective content of each of the respective sleep-time storages to the respective active-time storages in the processing circuitry before the processing circuitry resumes the data processing operations. This enables a single WIC to provide storage and wakeup functionality to an apparatus comprising two or more processing cores. Each core necessarily has its own active-time storage with the interrupts transferred to dedicated sleep-time storage in the WIC when the core enters the low power state. Each core then has its own events transferred back on exit from sleep.

Particular embodiments will now be described with reference to the figures.

Figure 1:
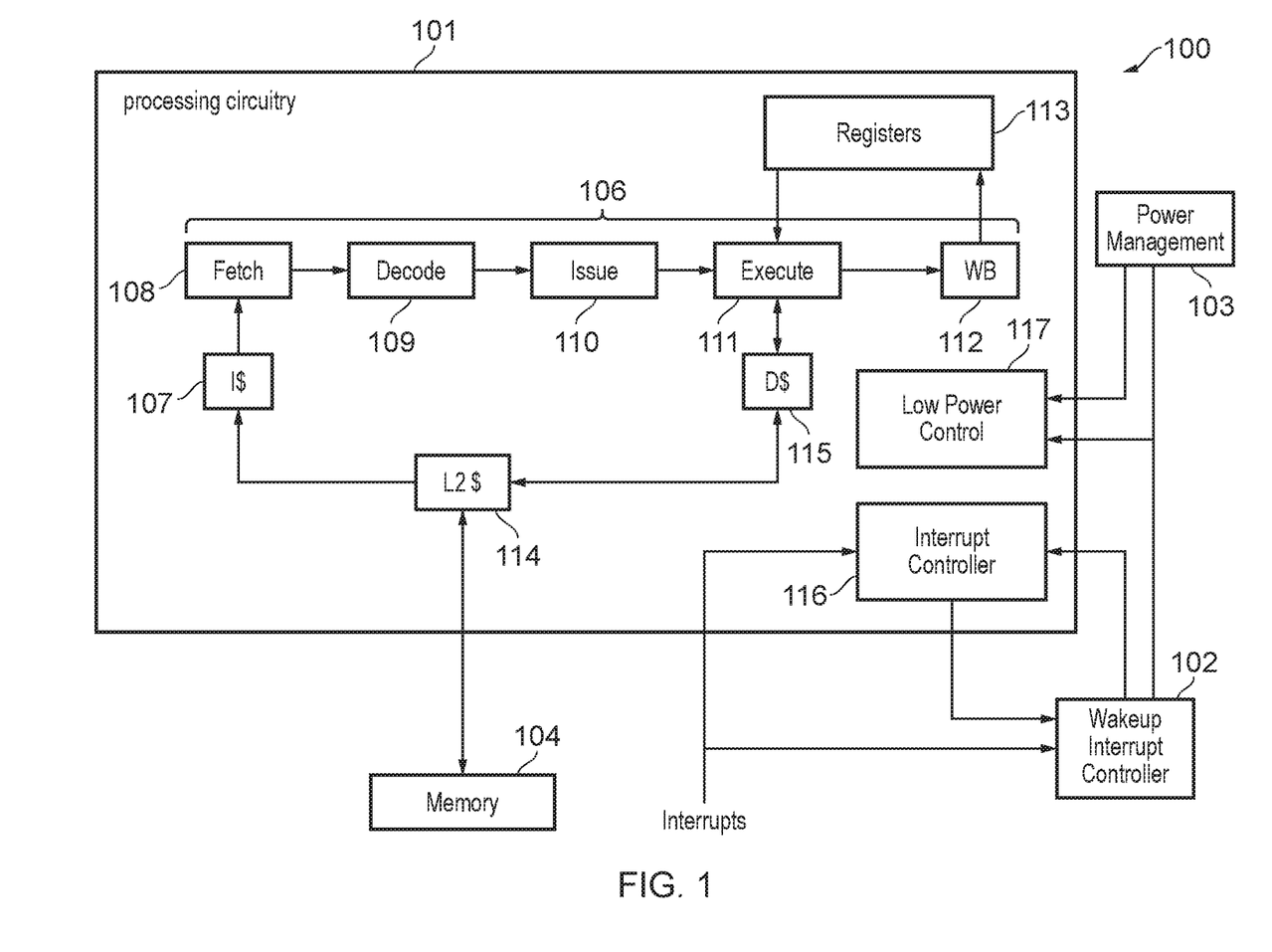
FIG. 1 schematically illustrates an example of a data processing apparatus including a wakeup interrupt controller in example embodiments.

FIG. 1 schematically illustrates a data processing apparatus 100 in accordance with one example embodiment. Processing circuitry 101 comprises a generally pipelined structure 106 for executing instructions, which is only illustrated at a cursory overview level here. In the example of FIG. 1, the processing pipeline 106 includes a fetch stage 108 for fetching instructions from the memory 104 to be cached in the L2 cache 114 and the L1 instruction cache 107. A decode stage 109 decodes fetched instructions. The issue stage 110 issues the decoded instructions for execution at the execution stage 111. A write back stage 112 may write back the result of an operation to a register in the register bank 113. It will be appreciated that FIG. 1 is merely exemplary and does not (even schematically) show all elements of the processing pipeline 106. An interrupt controller 116 may be provided in the processing circuitry 101 to manage interrupts received whilst the processing circuitry is active. A low power control 117 may be included to control the processing circuitry's entry to and exit from low power states. A wakeup interrupt controller 102 is used to manage interrupts received whilst the processing circuitry 101 is in a low power state. Power management circuitry 103 may also be provided to control power supply to the processing circuitry 101 as a whole or to its components individually.

Figure 2:
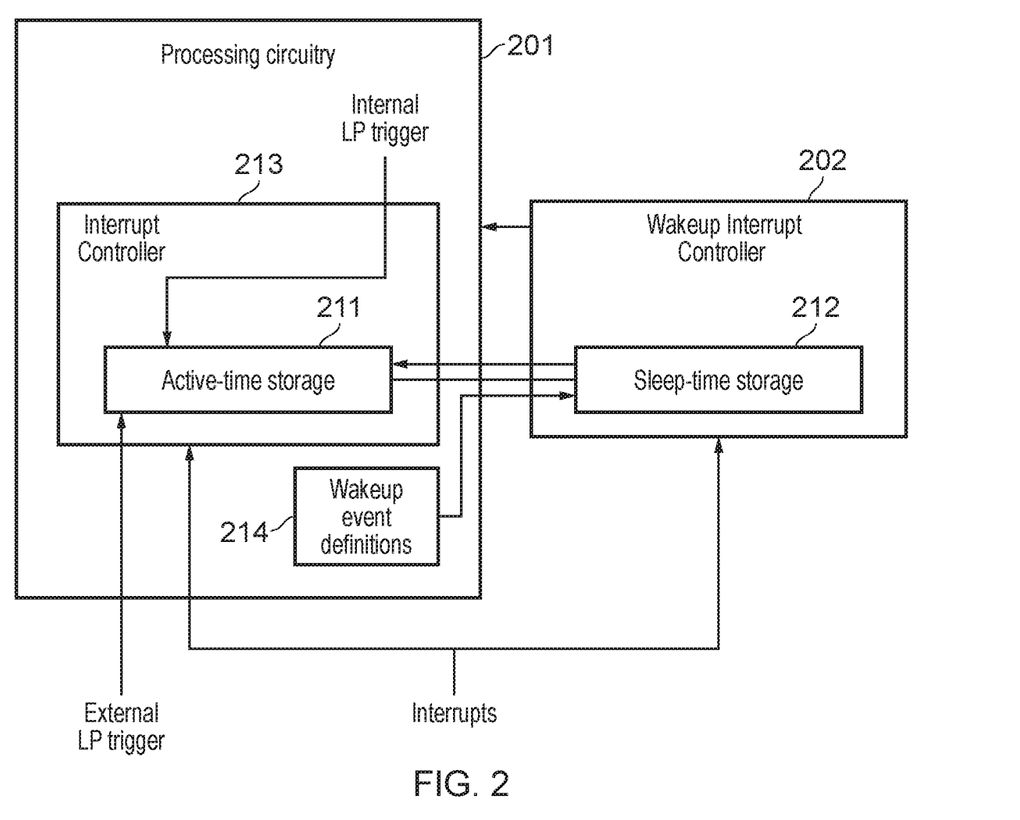
FIG. 2 schematically illustrates an apparatus in example embodiments.

FIG. 2 shows an apparatus according to an embodiment. The processing circuitry 201 comprises active-time storage 211, which in this embodiment is comprised within an interrupt controller 213 of the processing circuitry 201. In response to a low power (LP) trigger, which may be an internal LP trigger generated by the processing circuitry or may be an external LP trigger received from outside the processing circuitry, the content of the active-time storage 211 is transferred to the sleep-time storage 212. The sleep-time storage 212 is comprised in the wakeup interrupt controller (WIC) 202. Definitions of events 214 which will cause the processing circuitry 201 to exit from the low power state may also be transferred from the processing circuitry 201 to the sleep-time storage. These wakeup event definitions may comprise particular interrupts, in response to which the processing circuitry should exit its low power state in order to respond. Generally however indications of interrupts which are received whilst the processing circuitry 201 is in a low power state are stored in the sleep-time storage 212 of the WIC 202. When the WIC 202 receives a wakeup signal (as for example defined by the definitions transferred previously) the indication is stored in the sleep-time storage and the wakeup interrupt controller signals to the processing circuitry 201 that it should exit the low power state. As part of this exit from sleep, the content of the sleep-time storage 212 is transferred to the active-time storage 211. This includes any interrupt indications that were pending prior to the processing circuitry 201 entering the low power state (and were thus stored in the sleep-time storage 212 whilst the processing circuitry 201 was in the low power state).

Figure 3:
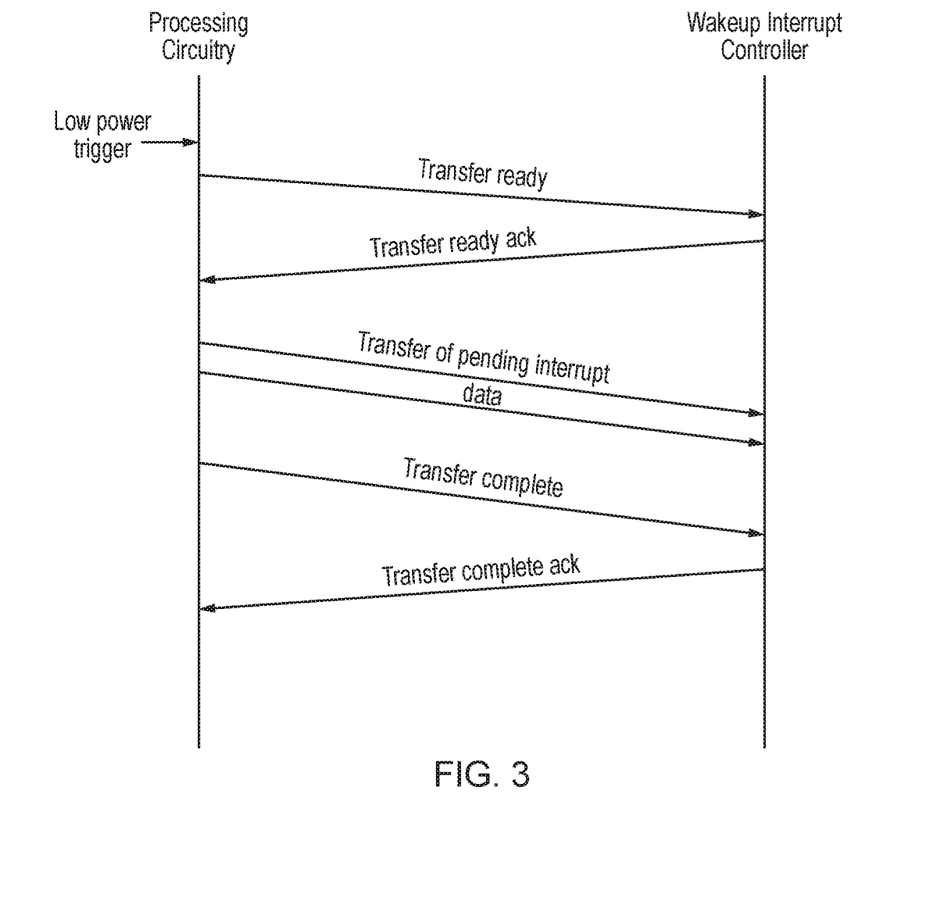
FIG. 3 schematically illustrates a handshake process between processing circuitry and a wakeup interrupt controller used when transferring pending interrupt indications in example embodiments.

FIG. 3 shows a sequence of handshake signals which are exchanged between processing circuitry and a wakeup interrupt controller in embodiments to administer the transfer of indications of pending interrupts. The processing circuitry initiates the transfer process in response to a low power trigger, signalling that the processing circuitry should enter a low power state. Firstly the processing circuitry sends a "transfer ready" signal to the wakeup interrupt controller. The wakeup interrupt controller acknowledges this signal and indicates its readiness to receive the indications of pending interrupts by returning a "transfer ready ack" signal to the processing circuitry. On receipt of this the processing circuitry transfers the indications of pending interrupts. Thereafter the processing circuitry indicates that the data transfer is complete with a "transfer complete" signal, which the wakeup interrupt controller acknowledges by returning a "transfer complete ack" signal to the processing circuitry. A similar exchange of handshake signals may be used for the transfer of indications of pending interrupts from the wakeup interrupt controller to the processing circuitry when the processing circuitry exits from the low power state.

Figure 4:
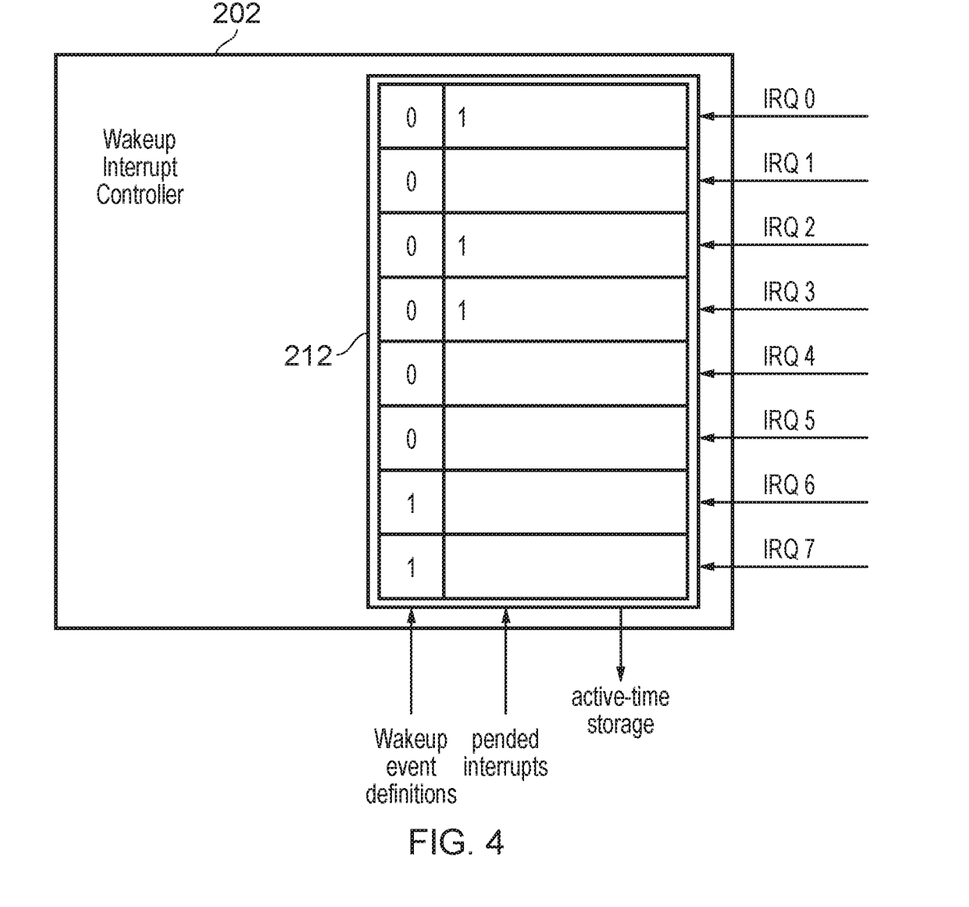
FIG. 4 schematically illustrates an example of a wakeup interrupt controller in example embodiments.

FIG. 4 shows an example configuration of the WIC of FIG. 2. In this example the wakeup event definitions indicate which of the interrupts received through interrupt request lines IRQ0-IRQ7 are wakeup signals. These indications take the form of bits set in the first column of the sleep-time storage 212. In the example shown, when the WIC receives either an IRQ6 or IRQ7 interrupt, it will cause the processing circuitry to exit the low power state. In addition the content of the active-time storage 212 is transferred (in this example also comprising indications of the interrupts IRQ0, IRQ2 and IRQ3) to the active-time storage. One or more of these interrupt indications may have been pended before the processing circuitry entered the low power state and transferred to the WIC 202. The active-time storage 212 does not distinguish between these previously pending interrupts and further interrupts which are received by the WIC 202 whilst the processing circuitry is in a low power state.

Figure 5:
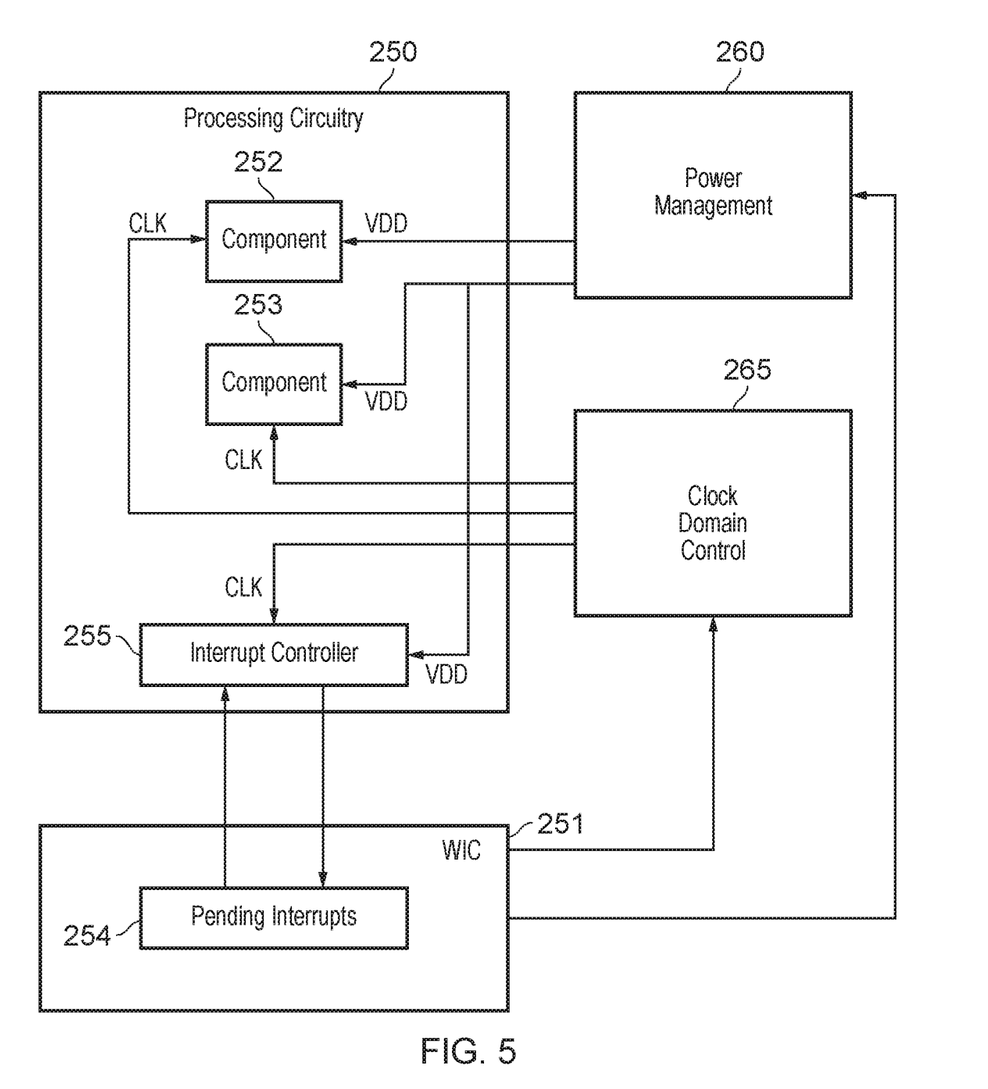
FIG. 5 schematically illustrates an apparatus in example embodiments.

FIG. 5 schematically illustrates an apparatus in accordance with one example embodiment comprising processing circuitry 250 and a wakeup interrupt controller 251. Two components 252 and 253 of the processing circuitry 250 are shown. The components 252 and 253 each participate in active data processing of the processing circuitry 250 when they are powered and are receiving a clock signal. Power, in the form of a VDD line, for each component is shown to be provided under the control of a power management unit 260 external to the processing circuitry. A clock signal CLK is shown to be provided to shown to be provided to each component under the control of a clock domain control unit 265 external to the processing circuitry. The power management unit 260 can thus implement a low power state of the processing circuitry by reducing or withholding the VDD signal to one or more of the components. Similarly the clock domain control unit 265 can also implement a low power state of the processing circuitry by altering or withholding the CLK signal to one or more of the components. Note that both of the power management unit 260 and the clock domain control unit 265 receive signals from the wakeup interrupt controller 251. This enables the wakeup interrupt controller 251 to signal that transfer of pending interrupt indications from the interrupt controller (comprising the active-time storage) to the pending interrupts storage (sleep-time storage) 254 in the wakeup interrupt controller 251 is complete, so that either or both of the power management unit 260 and the clock domain control unit 265 can the implement the low power state. Similarly, the wakeup interrupt controller 251 can then later signal the reception of a wakeup event indication to the power management unit 260 and/or the clock domain control unit 265, to cause the processing circuitry 250 to be brought out of the low power state.

Figure 6:
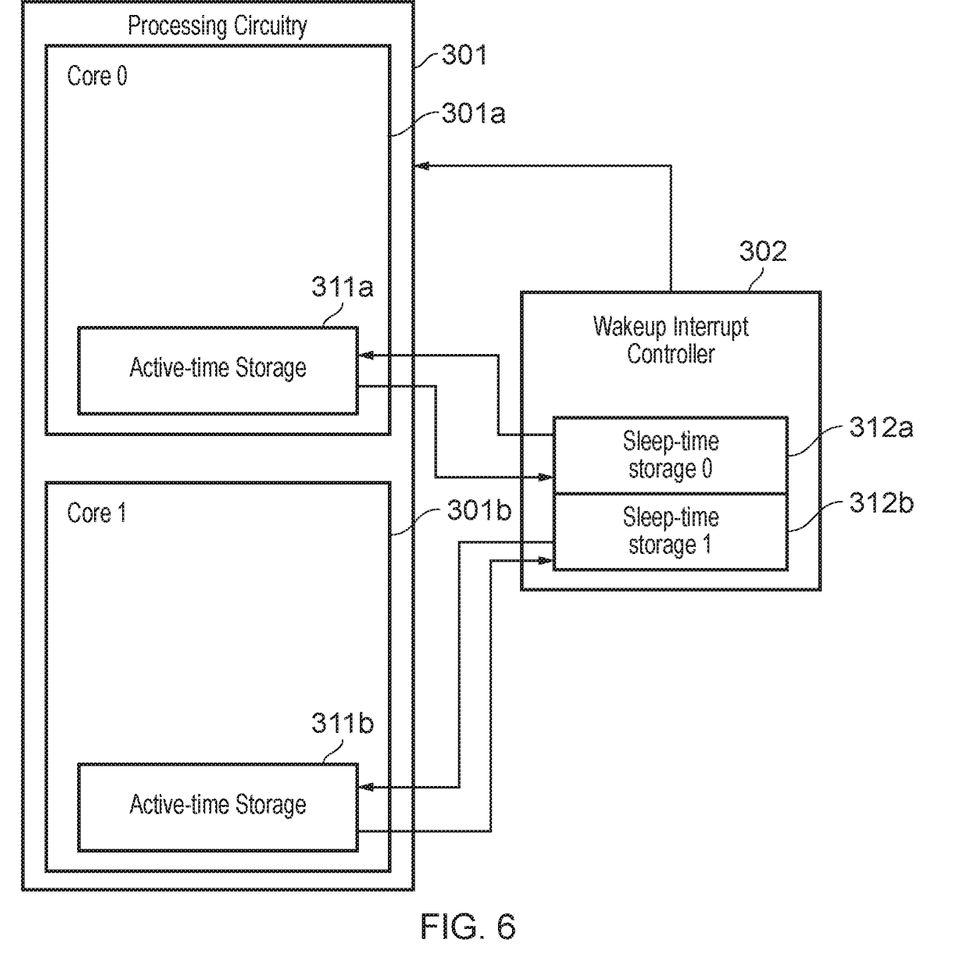
FIG. 6 schematically illustrates an example of two cores utilizing the same wakeup interrupt controller in example embodiments.

FIG. 6 schematically illustrates an example in which processing circuitry 301 comprises two separate processor cores 301a and 301b. Each of the cores 301a and 301b performs data processing independently and has its own instance of active-time storage 311a, 311b. When the processing circuitry 301 is to enter a low power state, the content of each of the respective storage elements 311a and 311b is automatically transferred (by hardware processes) to a corresponding portion of the sleep-time storage 312a, 312b in the wakeup interrupt controller 302. When a wakeup signal is received (e.g. a particular interrupt defined to be a wakeup signal), the content of each sleep-time storage 312a, 312b is transferred to the active-time storage 311a, 311b and the processing circuitry returns to a powered (active) state and the execution of instructions resumes in each of the cores 301a and 301b.

Figure 7:
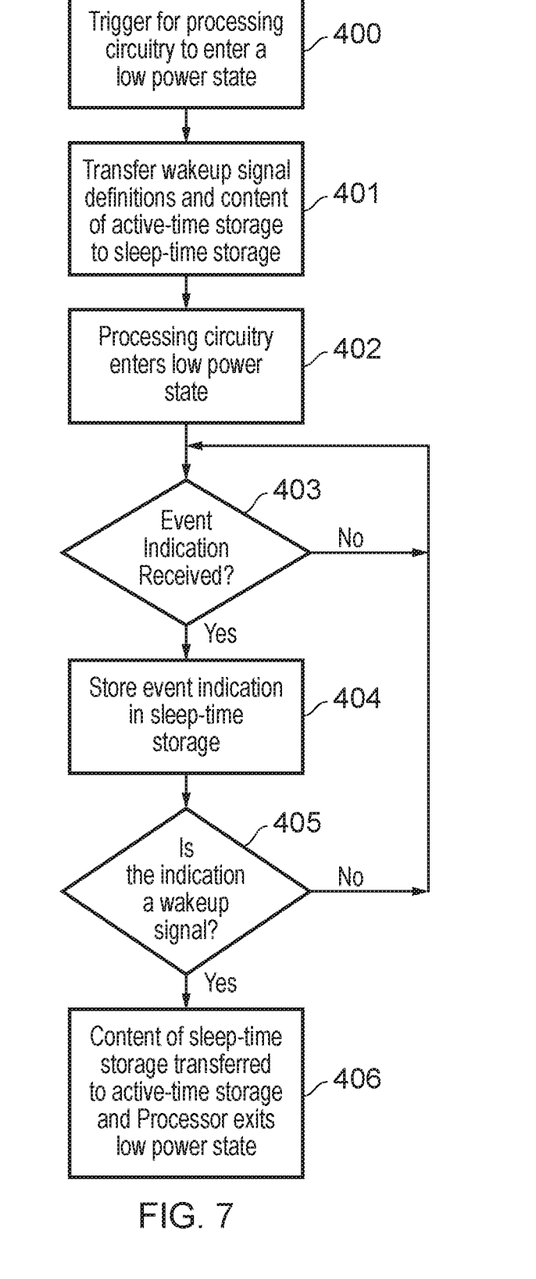
FIG. 7 shows a flow diagram illustrating steps in the method of example embodiments for entering and exiting a low power state using a wakeup interrupt controller.

FIG. 7 is a flow diagram showing a sequence of steps which are taken according to the method of one example embodiment. At step 400 a trigger occurs for the processing circuitry to enter a low power state. The processing circuitry may be capable of entering more than one type of low power state, though for the purposes of this explanation this is any power state in which the processing circuitry will not be (directly) responsive to interrupts. Following this, at step 401, the content of the active-time storage is transferred to the sleep-time storage along with the definition of any wakeup signals—that is the signals to which the WIC should respond by causing the processing circuitry to exit the low power state. Next at step 402 some or all of the power to the processing circuitry is removed and the processing circuitry enters the low power state. Next at step 403 it is determined (by the WIC) if an event indication has been received. The flow loops on itself at step 403 until this occurs. On receipt of an event indication the WIC stores an indication of this event in the sleep-time storage at step 404. A determination is made at step 405 as to whether the event indicated is a wakeup event. If this is not a wakeup event, then the flow returns to step 403 to await reception of another event indication. If however at step 405 this is a wakeup event, then at step 406 the WIC transfers the content of the sleep-time storage to the active-time storage (in the processing circuitry) and the processing circuitry is caused to exit the low power state. It should be noted that the system may be configured to be ready to immediately repeat this method, i.e. where the processing circuitry is now active again if a trigger occurs for the processing circuitry to enter a low power state, then the method flow would resume at step 400.

In brief overall summary apparatuses comprising data processing circuitry and a wakeup interrupt controller and methods of operating the apparatuses are disclosed. Prior to the processing circuitry entering a low power state, indications of pending interrupts are transferred to the wakeup interrupt controller. Further indications of interrupts received whilst the processing circuitry is in the low power state may be accumulated in the wakeup interrupt controller. When the wakeup interrupt controller receives a wakeup signal, the indications of pending interrupts are transferred to the processing circuitry and the processing circuitry exits the low power state.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
processing circuitry for performing data processing operations, wherein the processing circuitry comprises active-time storage for storing indications of pending events to which the processing circuitry has yet to respond; and
a wakeup interrupt controller, wherein the wakeup interrupt controller comprises sleep-time storage for storing a plurality of indications, wherein each indication of the plurality of indications indicates an events received whilst the processing circuitry is in a low power state,
wherein the processing circuitry is responsive to a low power trigger to transfer the indications of pending events which are the contents of the active-time storage into the sleep-time storage in the wakeup interrupt controller prior to the processing circuitry entering the low power state, and
the wakeup interrupt controller is responsive to receipt of a predetermined wakeup signal to cause the processing circuitry to exit the low power state and to transfer content of the sleep-time storage to the active-time storage in the processing circuitry before the processing circuitry resumes the data processing operations.

2. The apparatus of claim 1, wherein the sleep-time storage is further arranged to store information defining the predetermined wakeup signal.

3. The apparatus of claim 1, wherein at least one of the indications of events is an interrupt.

4. The apparatus of claim 1, wherein at least one of the events is a request for the processing circuitry to carry out a mode switching operation.

5. The apparatus of claim 1, wherein the processing circuitry comprises a first processor core and a second processor core, and at least one of the events is an event signal from the second processor core.

6. The apparatus of claim 1, the processing circuitry is further responsive to the low power trigger to transfer information defining the predetermined wakeup signal to the wakeup interrupt controller.

7. The apparatus of claim 1, wherein the predetermined wakeup signal is one of a plurality of predetermined wakeup signals.

8. The apparatus of claim 7, wherein the processing circuitry is further responsive to the low power trigger to transfer information defining the plurality of predetermined wakeup signals to the wakeup interrupt controller.

9. The apparatus of claim 1, wherein the low power state is a state in which power is withheld from one or more components of the processing circuitry.

10. The apparatus of claim 1, wherein the low power state is a state in which power is supplied at a reduced voltage to one or more components of the processing circuitry.

11. The apparatus of claim 1, further comprising a clock generator, wherein the low power state is a state in which a clock signal generated by the clock generator is withheld from the processing circuitry.

12. The apparatus of claim 1, wherein the low power trigger is a signal generated by the processing circuitry.

13. The apparatus of claim 1, wherein the low power trigger is a signal received by the processing circuitry.

14. The apparatus of claim 1, wherein the processing circuitry comprises an interrupt controller, and wherein the interrupt controller comprises the active-time storage.

15. The apparatus of claim 1, wherein the wakeup interrupt controller and the processing circuitry are arranged to perform a handshake process to ensure that all of the indications of pending events are transferred from the active-time storage to the sleep-time storage prior to the processing circuitry entering the low power state.

16. The apparatus of claim 1, wherein
the processing circuitry comprises a plurality of cores, each core of the plurality of cores arranged to perform respective data processing operations;

each of the plurality of cores comprises respective active-time storage; and the wakeup interrupt controller comprises respective sleep-time storage for each of the plurality of cores, wherein each respective sleep-time storage is arranged to store a plurality of indications, wherein each indication of the plurality of indications indicates an event received for the respective core whilst the processing circuitry is in the low power state, wherein the processing circuitry is responsive to the receipt of the low power trigger to transfer indications of pending events which are the respective contents of each respective active-time storage to the respective sleep-time storage, and the wakeup interrupt controller is responsive to receipt of the predetermined wakeup signal to cause the processing circuitry to exit the low power state and to transfer respective content of each of the respective sleep-time storages to the respective active-time storages in the processing circuitry before the processing circuitry resumes the data processing operations.

17. A method of operating an apparatus comprising:

performing data processing operations in processing circuitry, wherein the processing circuitry comprises active-time storage for storing a plurality of indications of pending events to which the processing circuitry has yet to respond;

storing a plurality of indications each an indication of an event received whilst the processing circuitry is in a low power state in sleep-time storage;

transferring indications of pending events which are the contents of the active-time storage into the sleep-time storage in response to a low power trigger prior to the processing circuitry entering the low power state; and in response to receipt of a predetermined wakeup signal, causing the processing circuitry to exit the low power state and transferring content of the sleep-time storage to the active-time storage in the processing circuitry before the processing circuitry resumes the data processing operations.

18. An apparatus comprising:

means for performing data processing operations, wherein the means for performing data processing operations comprises means for storing indications of active-time events to which the processing circuitry has yet to respond;

means for storing a plurality of indications wherein each indication of the plurality of indications indicates a sleep-time events received whilst the processing circuitry is in a low power state;

means for transferring the indications of pending events which are the contents of the means for storing indications of active-time events into the means for storing indications of sleep-time events in response to a low power trigger prior to the means for performing data processing operations entering the low power state; and in response to receipt of a predetermined wakeup signal, means for causing the means for performing data processing operations to exit the low power state and transferring content of the means for storing sleep-time events to the means for storing active-time events before the means for performing data processing operations resumes the data processing operations.

* * * * *